United States Patent
Ribot

(10) Patent No.: US 8,065,425 B2
(45) Date of Patent: *Nov. 22, 2011

(54) ACCESS CONTROL IN CLIENT-SERVER SYSTEMS

(75) Inventor: Stephan Ribot, Le Chesnay (FR)

(73) Assignee: Rockstar Bidco LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/978,961

(22) Filed: Dec. 27, 2010

(65) Prior Publication Data

US 2011/0106957 A1    May 5, 2011

Related U.S. Application Data

(63) Continuation of application No. 10/312,004, filed as application No. PCT/EP01/07168 on Jun. 25, 2001, now Pat. No. 7,890,640.

(30) Foreign Application Priority Data

Jun. 23, 2000    (GB) .................................. 00401808.1

(51) Int. Cl.
    *G06F 15/16* (2006.01)
(52) U.S. Cl. ........................................ 709/229; 709/225
(58) Field of Classification Search .................. 709/225, 709/229
    See application file for complete search history.

(56) References Cited

FOREIGN PATENT DOCUMENTS

| EP | 0913966 A2 | 5/1999 |
|---|---|---|
| WO | WO 98/50853 A1 | 11/1998 |
| WO | WO 99/57863 A1 | 11/1999 |
| WO | WO 99/60487 A1 | 11/1999 |

OTHER PUBLICATIONS

Slama et al., "Enterprise CORBA", Prentice Hall, 1999, pp. 103-120.

*Primary Examiner* — David Lazaro
(74) *Attorney, Agent, or Firm* — Barnes & Thornburg LLP

(57) ABSTRACT

A telecommunications network and a method of operating the same are described which is a shared by two or more organizations, the network including at least a server and a client. The server is adapted to transmit to the client a proxy communications object comprising a definition of the rights and privileges of an organization to use the network. When the organization initiates a request to the server it does so via the proxy object on the client The proxy object enables a comparison of the contents of request and the definition of the rights and privileges and enables forwarding of the request to the server only when the request and the rights and privileges granted to the requesting organization are consistent with each other. The request relates to modification of a management object maintained at a network resource, the organization having a global right to access the network resource. By this means unwanted accesses to the server may be prevented at the client.

18 Claims, 6 Drawing Sheets

ACCESS CONTROL IN CLIENT-SERVER SYSTEMS

CROSS-REFERENCE TO RELATED APPLICATIONS

This application is a continuation of U.S. patent application Ser. No. 10/312,004, filed Mar. 17, 2003, now U.S. Pat. No. 7,890,640, which is the national filing of International Application No. PCT/EP01/07168 filed Jun. 25, 2001.

The present invention relates to server-client networks in which a client terminal communicates with a remote server in accordance with role based access control operating in response to roles and access privileges. The present invention may find advantageous application in trunked wireless telecommunication networks as well as satellite systems, particularly, cellular telephone and data systems, cordless public telephone systems, personal communications services (PCS), public mobile radio (PMR), Metropolitan Area Networks (MAN) which are used by at least two organizations with different access privileges.

TECHNICAL BACKGROUND

In many distributed networks a server application running on a server computer provides services or functions to a remote client. Security features control access of clients to particular services or functions on the server. The access privileges may be limited to individual users or to groups of users. It is often desirable to provide some capability for a user to change the membership of a user group or to change some of the functions the group may be able to access. Generally, a distributed network will have some centralized control unit which will supervise the access privileges and also maintain access codes such as ID's and passwords. To make such changes a remote terminal of a user will access the centralized control unit and request changes. Conventionally, the server which operates the control unit function will perform authorization checks every time the client makes a request to determine if the user making the request is authorized to alter the access privileges. This repetitive authorization takes up time and blocks transmission bandwidth on the network.

As one example of a distributed network, there are many telecommunications systems which have an air interface which is operated in a trunked manner, that is the communication channels of the air interface are a shared resource among several users. No channel is permanently dedicated to a user, but each channel is assigned temporarily to a user for the duration of a transmission. Such systems usually comprise a network of elements, e.g. switches, base station radio transceivers, base station controllers and databases, connected together by landlines. Representative networks are a GSM cellular telephone network as described in "The GSM System for Mobile Communications", Cell & Sighs, 1992, or a CDMA cellular system as described in "CDMA Systems Engineering Handbook", Artech House, 1998, a cellular data network such as the GPRS system described in "Wideband CDMA for Third generation Mobile Communications", Artech House 1998, a PMR network as supplied by Matra Nortel under the system name MC9600, a cordless public access system (e.g. Bi-Bop) as described in "Cordless Telecommunications Worldwide", Springer, 1997, the terrestrial part of a satellite transmission system as described in "Satellite Communications Systems", Wiley, 1998.

The network may be divided logically (and usually physically) into a traffic part which carries user messages and the control signals required therefor and an operations and maintenance part (an Operations and Maintenance network) which controls the operation of the network, e.g. recovering billing information, reporting traffic densities, reporting outages or failures. Due to the expense, complexity and level of disturbance caused by multiple installations particularly in urban areas, it is advantageous to provide a landline network which may be shared by several organizations rather than each organization installing their own network hardware. Such a system has been proposed by Bell Atlantic which allows different operators to provide personal communications services using the same network. Five different access possibilities are provided depending on the installed state of the relevant operator's network. In the system a "D" interface (external Data interface) is provided for the PCS provider to access a centralized database in the Bell Atlantic system. This access may be used for customer location updates, customer authentication, customer service profile access, etc. To manage these services an access manager function is provided. This access manager may be described in other systems by other names and may be either centralized or distributed provided the customer profiles remain consistent. It may be composed of several units with specific functions such as an authentication center, a home location register, a customer profile database, for example.

It is desirable to provide individual user organizations with some degree of control over their own use of the main shared network. For instance an organization may wish to define user groups and to modify these from time to time, e.g. add a new member to a group, delete a member or a whole group, change the geographical range of access of a user group. A user group may be defined as a "role". To prevent one user organization monopolizing the scarce resources of a network such changes must be coordinated with or controlled by a network access manager function, e.g. by a centralized or distributed function which will be called a mediation device. Requests from user organizations can be sent to the mediation device via the operations and management network (OMN), e.g. an external terminal at the user organization's premises obtains access to the OMN (e.g. via the Internet or other more secure means) and sends a request to the mediation device. This request is processed and if approved the changes are made and the network updated accordingly.

Where several organizations share a network, e.g. a fleet of hospital ambulances, the police force, a cellular telephone operator, it is important that security is maintained and that cross-access between the organizations is not possible. Also, one organization should not be able to manipulate, influence or change the customer profiles of another organization. Conventionally, access to a mediation device requires authentication and authorization checks. By authentication is meant that a check is made as to the identity of the user accessing the network. This may be achieved by several different means, entering passwords or personal identity numbers (PIN), insertion of a device into a suitable reader, e.g. a smart card, fingerprint analysis, retina analysis being just a few examples. Authorization means the ability to restrict access to certain data or services to certain users only. For instance, access control lists (ACL) may be used to associate an authorized user set with a resource. The setting up and maintenance of authorization schemes is very time consuming.

EP 913 966 describes an access control scheme for a distributed client-server network. Access control objects, group objects, rule objects and management objects are provided. The rule objects specify a set of group objects, a set of management objects and access rights by users which belong to a group. Access control servers process access requests. Each access control server controls access to a distinct subset of the management objects in accordance with access rights specified in an access control database. Each access request is sent for processing to one or more of the access control servers for granting denying or partially granting the access requested in accordance with the access rights specified in the access control database. As explained in this document use of a single access server can result in overloading. The revised system makes use of several servers and results in access requests being transmitted through the network before the access rights for the request are confirmed or denied. This results in a traffic load on the network of access requests some of which are subsequently denied.

WO 98/50583 and WO 99/57863 relate to a network desktop management security system which allows or denies access to specific resources, such as a computer program or a file.

WO 99/57863 also relates to a network system in which a user request for a network resource such as an application can be accepted or denied.

It is an object of the present invention to reduce the time necessary to set up and maintain an authorization system in a telecommunications network, especially a trunked radio telecommunications network which may be shared by two or more independent organizations.

It is a further object of the present invention to reduce the amount of unnecessary signaling in a telecommunications network, especially a trunked radio telecommunications network which may be shared by two or more independent organizations.

SUMMARY OF THE INVENTION

The present invention provides a method of operating a telecommunications network shared by two or more organizations, the network including at least a server and a client, comprising the steps of: the organization initiating a request to the server via a proxy communications object on the client; the proxy object enabling comparison of the contents of the request with a definition of the rights and privileges of an organization to use the network, and, responsive to the comparison step, enabling forwarding of the request to the server, further comprising the step of: the server transmitting to the client at least a first component of the proxy communications object, the first proxy communications object component comprising the definition of the rights and privileges. The request relates to modification of a management object maintained at a network resource, the organization having a global right to access the network resource. Preferably, the request is only forwarded when the request and definition of the rights and privileges granted to the requesting organization are consistent with each other. Hence, the proxy controls individual requests to a network resource for which the organization is authorized to use. However, the proxy examines the content of the request to determine if the modification goes beyond the rules and privileges possessed by the organization. A second proxy component may carry out the comparison and the first component enables transmission of the request based on a response from the second component. Communications between the server and the client are preferably defined by a common object model protocol. The client preferably only has read only access to the rights and privileges included within the communications proxy object or one of its components. The proxy object or one of its components preferably inherits the definition of the rights and privileges for an organization from a second object. The second object is preferably a data object. The method may also include the step of transmitting a further proxy communications object to the client, the second proxy communications object comprising a further definition of the rights and privileges of an organization to use the network. Preferably, the network has at least one base network providing radio communications to user terminals and an operations and maintenance network comprising the server.

The present invention also provides a telecommunications network for shared use by at least two organizations, the network having at least one server and one client, the server being adapted to distribute at least a first component of a proxy communications object to the client, the first distributed proxy communications object component comprising a definition of the rights and privileges of an organization to use the network. Communications between the server and the client are preferably defined by a common object model protocol. The distributed proxy component is preferably stored on the client and the client is adapted to access the distributed proxy communications object component before completing set-up of a communication with the server. Preferably, the client only has read only access to the distributed proxy communications object component. Preferably, the distributed proxy communications object component is adapted to inherit the rights and privileges from a second object. Preferably, the distributed proxy communications object component is adapted to enable comparison of the contents of the request and the definition of the rights and privileges of the user. The request relates to modification of a management object maintained at a network resource, the organization having a global right to access the network resource. A second client proxy communications object component is preferably adapted to enable forwarding of the request to the server in response to the comparison. Preferably, the request is forwarded only when comparison step determines that the request and the rights and privileges are consistent.

The present invention also provides a network element for use in a telecommunications network for shared use by at least two organizations, the network comprising at least a server and a client, the network element being adapted to distribute a communications proxy object via the network to a client, the distributed communications proxy object comprising a definition of the rights and privileges of an organization to the network. The element is typically a server. The network element is preferably adapted to distribute the communications proxy object as defined by a common object model protocol.

The present invention also provides an external client user device for communication with server on a telecommunication network for shared use by at least two organizations, the external client user device storing a proxy communications object comprising a definition of the rights and privileges of the user to use the network, and the external client user device being adapted to access the proxy communications object before communication with the server and the proxy communications object being adapted to enable comparison of the contents of the request and the definition of the rights and privileges of the user and responsive to the comparison, enabling forwarding of the request to the server. The request relates to modification of a management object maintained at a network resource, the organization having a global right to access the network resource. Preferably forwarding is only carried out when the contents of the request and the rights and privileges are consistent. The proxy communications object may comprise two components, one comprising the definition of the rights and privileges and one for setting up communications with a remote server. The client user device may be adapted to communicate with the server using a common object model protocol. Preferably, the client user device only has read only access to the proxy communications object.

The dependent claims define independent embodiments of the invention. The present invention will now be described with reference to the following drawings.

BRIEF DESCRIPTIONS OF THE DRAWINGS

DEFINITIONS

Operation: equivalent, for a distributed object, to a method of an object in object oriented programming.
Organization: entity using radio terminals for accessing trunked resources of a network in accordance with the present invention. These resources may be dedicated or shared. An organization may have rights of exploitation and utilization of the partitioned or non-partitioned services of the network.

DESCRIPTION OF THE ILLUSTRATIVE EMBODIMENTS

The present invention will be described with reference to certain embodiments and with reference to certain drawings but the present invention is not limited thereto but only by the claims. In particular the present invention will mainly be described with reference to public mobile radio systems but the present invention is not limited thereto. The present invention may be applied to a distributed network in which a remote terminal accesses a server application in order to change access privileges in a role-based access control system. For instance, the present invention may be advantageously used in wireless local area networks (LAN) or Metropolitan Access Network, (MAN), in the terrestrial part of a satellite communications network, in cellular telephone or data networks, in cordless public telephone or data networks.

Figure 1:
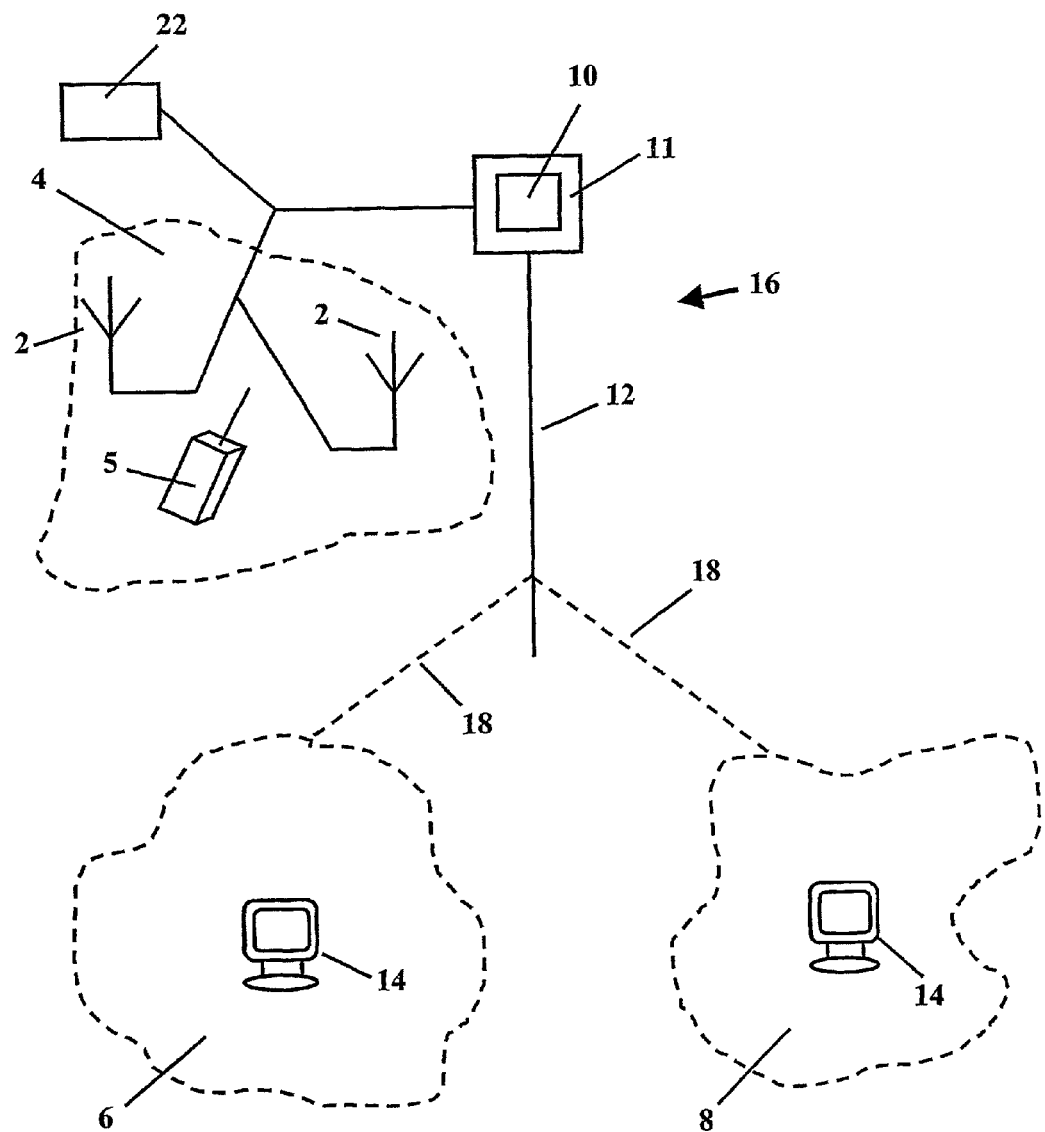
FIG. 1 is a schematic representation of a network in accordance with an embodiment of the present invention.

A schematic representative network 1 in accordance with an embodiment of the present invention is shown in FIG. 1. The network 1 is a system of private radio communications. It includes at least one base transceiver station (BTS) 2 having a radio coverage area within at least one base network (BN) 4 which provides radio telecommunication services to one or more organizations 6, 8 who share the facilities of the base network 4. The radio telecommunications services provided across the air interface between the BTS 2 and user radio terminal 5, are at least partly trunked. A mediation device 10, e.g. an application running on a server 11, is provided for controlling and managing changes to customer profiles, a communications network 12 linking the mediation device via the server 11 with an external data terminal 14 which may be located at an organization's premises. Customer profiles may be recorded in the network as management objects in the network, which contain management information and resource control variables. The present invention relates to methods and apparatus for restricting access to management objects. The mediation device 10 maintains the management objects. Management objects are sometimes called "managed object instances" (MOI's). Objects are often described as either "object instances" and "object classes". In the terminology of the present invention, an object is in fact an object instance as implemented as every object is an instance of a respective object class, however as the present invention makes use of a common object model an object is, within this context, an abstract object instance which is implemented as a concrete instance at a specific device.

Communications network 12 is part of the operations and maintenance network (OMN) 16 of network 1. Communications on OMN 16 may be made in any suitable protocol, e.g. X25. The OMN 16 allows supervision of network 1 on every technical, tactical and operational aspect. The MD 10 (mediation device) component of the OMN 16, is provided on the principal data server 11. It has to ensure the integrity of the system by verifying the commands given by the operators and to limit the diffusion of the information to only authorized persons. The MD 10 can be connected via the server 11 and OMN 16 to a plurality of operations and maintenance centers (OMC) 22, each OMC 22 managing one BN 4 and thus the MD 10 allows the simultaneous supervision of the infrastructure of a plurality of different BN 4. Communications between the external terminal 14 and the mediation device 10 are preferably secure, e.g. via the Secure Socket Layer protocol, and may be carried out via an intermediate network 18 such as the Internet or via a more secure dedicated communications line. The organization may make request via external data terminal 14 to update or change the organization's profile as determined by the mediation device 10.

The present invention makes use of Common Object Model (COM) technology to organize the OMN 16. Some principles of COM are described in the article by S. Gani and P. Picuri entitled "The object revolution, how COM technology is changing the way we do business", Computing and Control Engineering Journal, vol. 6, no. 3, June 1995, pages 108 to 112. In particular the present invention will be described with reference to a specific COM scheme called the CORBA standard, but the present invention is not limited thereto. For instance, alternative COM technologies may be used such as DCOM as described in "Comparison between CORBA and DCOM: architectures for distributed computing", Thompson et al., 0-8186-8551-4198, IEEE 1998 or "Reliability and availability issues in Distributed Component Object Model (DCOM), 0-7803-4290-9/97, IEEE, 1997. COM makes use of certain aspects of object oriented programming. In object oriented programming objects may be broadly categorized as classes, methods or data. Brief details of methods, classes and inheritance as used in object oriented programming are described in Computing and Control Engineering Journal, vol. 4, no. 1, February 1993, "The object oriented paradigm: means for revolutionizing software development", by Barker et al., pages 10 to 14.

Figure 2:
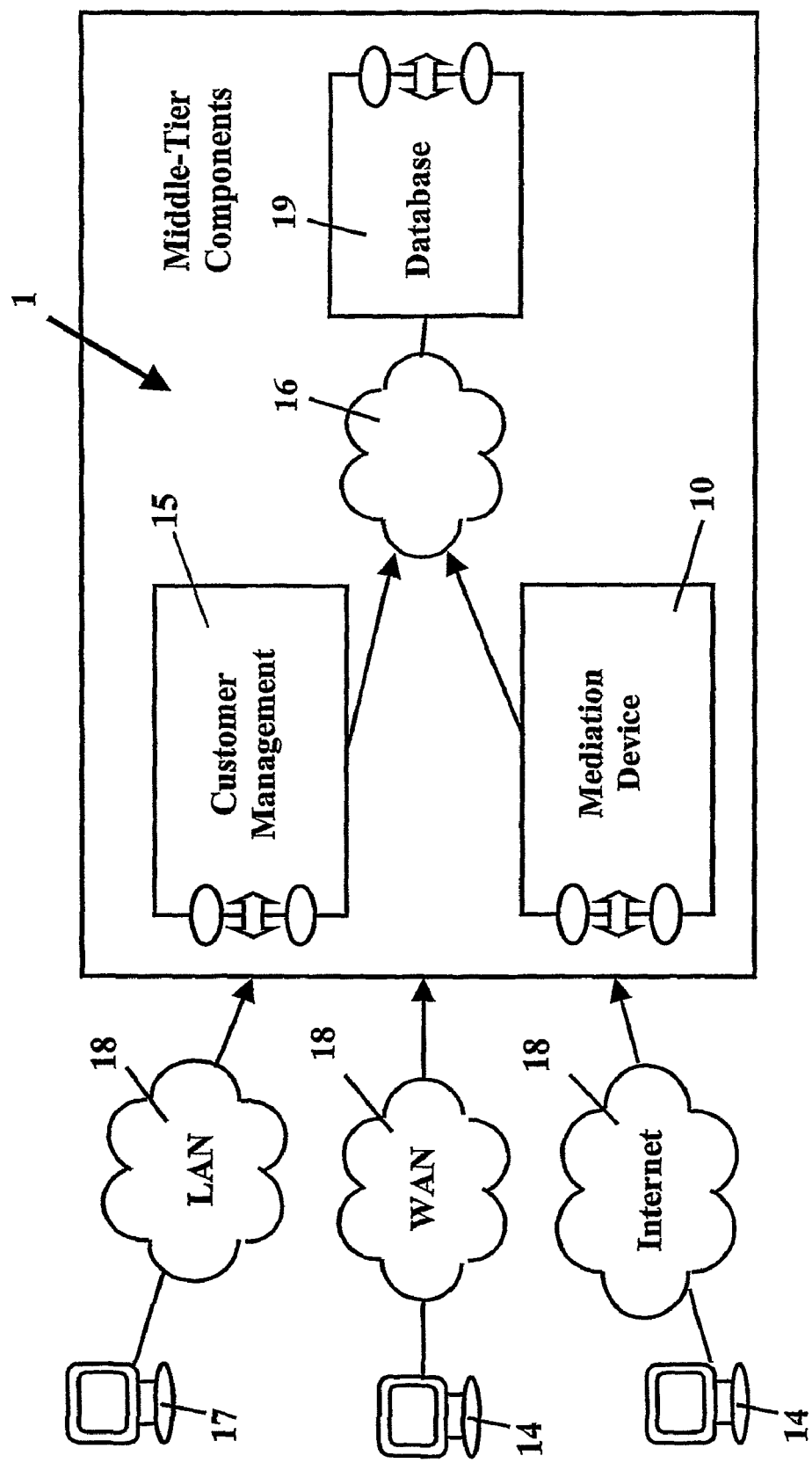
FIG. 2 is a general representation of an N-tier network architecture which may be used with the present invention.

The application of the CORBA standard to large size, n-tier networks is described in "Enterprise CORBA", Slama et al., Prentice Hall, 1999. A generalized N-tier architecture is shown in FIG. 2, in which one or more client terminals 14 may access the OMN 16 via a network 18, e.g. LAN, WAN or the Internet using CORBA compliant software. The OMN 16 includes a variety of components, e.g. the mediation device 10, a customer management application 15 and a database application 19 all of which are CORBA compliant. Certain components of the network 1 such as a tactical management application 17 may access network 1 via an external terminal 14.

Figure 3:
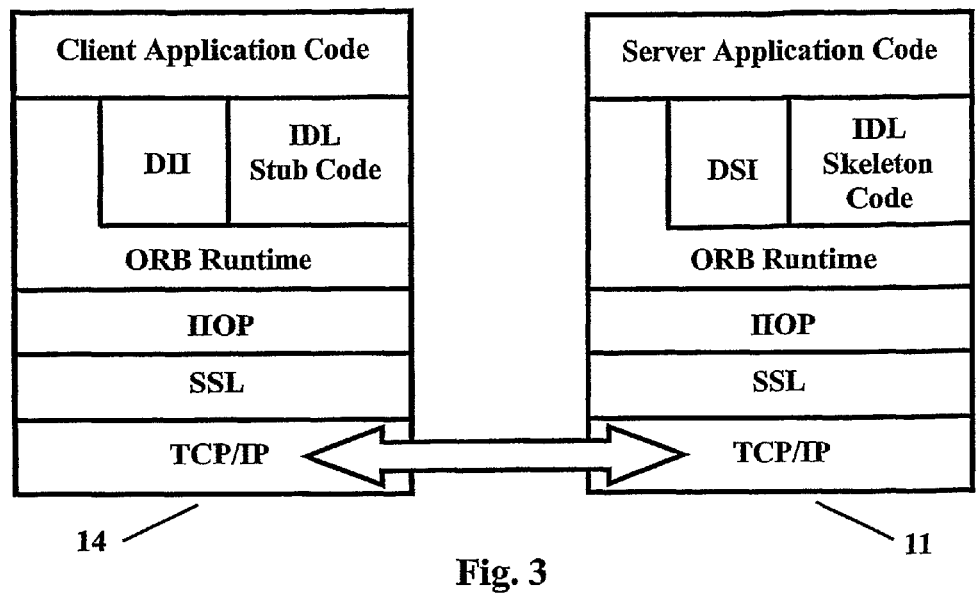
FIG. 3 is a schematic representation of how a secure protocol may be implemented between a server and a client.

The CORBA standard may be used in accordance with the present invention to allow supervision services on different types of external terminals and the opening of a normalized interface of the whole of the supervision services allowing organizations to develop, monitor and change their own applications. The services are distributed in such a way as to protect the partitioned construction of the given data and to optimize the network resources between a server and its clients. The communication protocol used between the MD 10 and other network elements of OMN 16 respects the CORBA standard. The interfaces are described in a normalized format called IDL (Interface Definition Language). Communications between the client terminal 14 and the server 11 may be secure by using SSL as part of the protocol stacks of client and server as shown schematically in FIG. 3. Preferably data integrity is maintained for transmissions between terminal 14 and MD 10, i.e. maintaining the correctness of the content of any message between source and target. Data integrity may be achieved by the use of suitable routines which detect tampering, e.g. check sum may be added to each message. For instance a Message Authentication Code (MAC) may be added to each message. The MAC is generated by applying a hash function to the message content. The hash code may be encrypted by the sender and decrypted by the receiver. The MAC must correspond to the hashed version of the received message. Preferably, non-repudiation is provided for communications between client terminal 14 and MD 10, i.e. prevention of denial by the client that a particular message was sent or request made.

In accordance with an embodiment of the present invention objects are generated and distributed by the MD 10 to ensure not only the allocation of services, but also the limitation of the range of those services to the domains of utilization authorized by the organization's profile. The organization's profile is a management data object in accordance with the present invention. Generally, an organization has global access to its own management objects. The objects distributed by the MD 10 act as a filter to filter out invalid requests at the client's location. The requests are determined by the content of the request. The requests may be invalid because of human error, because an organization's terminal software does not operate correctly, or because of a malicious attempt to damage another organization. An access control decision function (ACDF) is the procedure (or set of procedures) that applies the access control rules to each access request so as to determine whether the requested access to a management object should be granted or denied. An access control enforcement function (ACEF) is the procedure (or set of procedures) for enforcing the decisions made by the ACDF. Both of these objects are located on the client equipment. In particular, the ACEF controls access denial and prevents forwarding of the access request to the appropriate network management objects.

An advantage of the present invention is to do the whole of the security and access controls during the authentication and authorization of the client organization. Thus, a set of objects containing the authorized privileges and credentials is distributed and from this time on no further attention need be paid to it. This reduces maintenance time for authorizations as the client organization is prevented from requesting the activation of services outside the domains authorized by the profile which can be retrieved locally to the client's terminal, i.e. without access to the mediation device 10 or in fact any other server of OMN 16. At the same time the regular distribution of updates to the objects maintains the consistency of the data.

A profile is associated with each organization using network 1 and is a management object. The profile defines the organization's privileges in a set of credentials. These credentials include the authorized exploitation functions, and the geographical extent of these functions, e.g. how many of the BN 4 on which the functions can be used, as well as the rights of sub-groups of the organization, e.g. specific user groups or roles. For example, let us assume there is one organization, a hospital. The privileges of this organizations will be defined by a geographical area and by a set of users. The base network 4 is defined by an ID code, BN_ID of three digits, e.g. 750. The hospital has several fleets of ambulances, each fleet being defined by a code, e.g. a three digit code Fleet_ID. One fleet is wholly owned by the hospital and has the code number 100, another fleet is run by a charitable organization and has the fleet code 101. Within each of the fleets there are users, each defined by a User_ID, such as a three digit code for each user, for instance 100, 101 . . . 10N. A subscriber address is made up of a concatenation of these three codes, e.g. BN_ID Fleet_ID User_ID. An example would be 750100100.

As an example, a talk group object identified by a three digit code TKG_ID is defined as the association between a set of subscriber addresses and a geographical coverage. For instance, such a talk group would include the association of a coverage area identified by a code COV_ID and defined by a set of radio cell coverages and the relevant user group defined by a set of subscriber addresses. This latter set is defined using subscriber addresses referencing subscribers that belong to the same fleet in the same base network and can be defined by the end addresses of the subscribers, for example 750100100 to 750100200 or by a list of addresses. Let us say that the COV_ID=10 only includes the coverage area defined by BTS 2. A talk group 1 includes the association between COV_ID 10 and the subscriber addresses 750100100 to 750100200. Talk groups, fleet ID's, user ID's etc. all belong to the security aspects associated with network 1 as well as defining which parts of the network 1 may be used by any organisation.

The hospital may wish to change the user groups in the talk group or change the geographical area reachable by that talk group. Such a change may affect the resource allocation of network 1. Hence, any such change must be approved by the operating system of network 1. Also, it should only be possible for any such change to be made by the relevant hospital and not by another organization.

Objects distributed by the MD 10 in accordance with the present invention play an active role in security. They not only define all the services (i.e. operations) which are available to any organization but also define specific attributes of an organization and/or a base network which restrict the area of utilization of the offered services. Each organization is limited to the domains defined by the distributed object. Servers in OMN 16 are exempted from controlling, at every request, the rights of the requesting organizations, as the distributed objects act as a "filter" to prevent invalid requests at their source, i.e. at the organization's external terminal 14.

With reference to network 1, an organization can make certain requests to MD 10:

- Create a new-communication object, that is create a new relationship between members of the organization and the services offered, e.g. a new user group.
- Modify an existing communication object, e.g. add another member to a user group.
- Delete a communication object, e.g. delete a user group.
- List all attributes of a communication object, e.g. all members and their rights and privileges.

Any of these operations can be carried out on any of the base networks BN 4 of the network 1 and by any organization making use of a network 1.

In accordance with an embodiment of the present invention, the MD 10 distributes a managing communications object (which will be called CommMgr hereinafter) in order to provide services for a client organization. CommMgr possesses the four operations (for distributed objects an operation is equivalent to a method in normal object oriented programming) corresponding to the four type of requests mentioned above. CommMgr is distributed to remote client terminals where it functions as a proxy. With the aid of this proxy, a client organization will be able to activate the services related to the requests, that is can set up a communication pathway to MD 10 through the network and make a change request. However, distribution of such an object would still oblige each accessed server of OMN 16 receiving the request to systematically verify the domains of application of the following services:

- Verifying that the client organization has the right to work on the BN concerned,
- Verifying that the specific client making the request has the rights in view of the organization for which the request is made In order to palliate these inconveniences, the distributed object CommMgr in, accordance with the present invention inherits from a second object whose only function is to limit the range of operations of the distributed object CommMgr. This second object does not define any operation (or method), but contains the reference of an organization and/or of a BN 4, which specifies the domain of application of the operations, i.e. it is a data object. This second object is resident in server 11 or could be provided on another node of the OMN 16, e.g. in database server 19. Each proxy (CommMgr) distributed by the MD 10 defines exactly the domain of application of offered services. These data cannot be modified by the client organization as the client's terminals have read-only access to the attributes defining the client's profile. So, at the time the client organization requests a first connection, the receiving server of the OMN 16, after authentication, will generate the proxy to be sent to that client organization in function of the services and domains to which the organization has rights. This proxy is now available at the client organization's external terminal. The next request from the client's terminal will access the proxy which enables a comparison of the request and the authorization credentials in the proxy. Depending upon the comparison, the proxy can enable forwarding of the request. For example, if the request and the privileges do not match, the request is aborted and/or any other suitable action is taken to prevent the request being made. On the other hand if the authorization credentials are consistent with the request, the proxy enables forwarding of the request to the server 16. Afterwards, it will not be necessary to verify the rights of the client organization as the fact that the client organization is in possession of a proxy which has allowed the request to proceed to the server will be sufficient for proving the rights of the client organization.

The skilled person will appreciate that the access control decision function (ACDF) (which is the procedure (or set of procedures) that applies the access control rules to each access request so as to determine whether the requested access to a management object should be granted or denied) is implemented by the proxy in accordance with the present invention. The access control enforcement function (ACEF) (which is the procedure (or set of procedures) for enforcing the decisions made by the ACDF) is also performed by the proxy.

Figure 4:
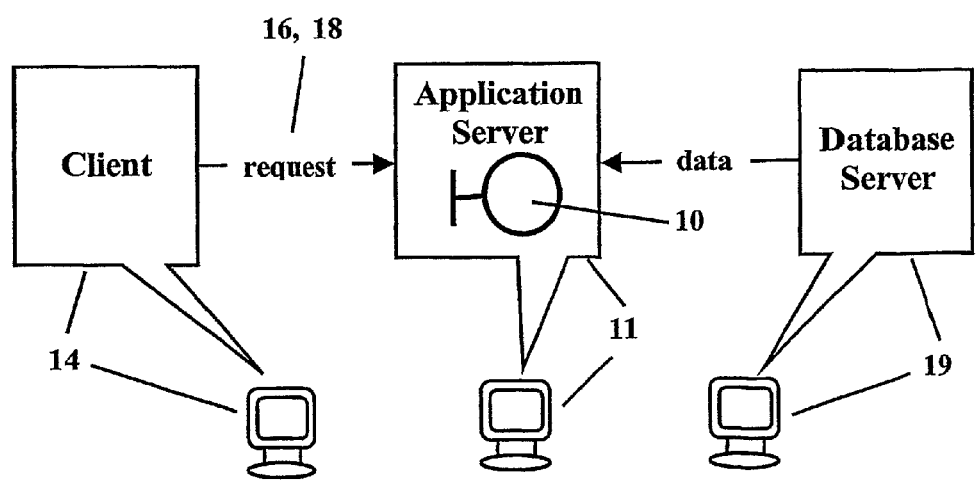
FIG. 4 is a schematic representation of a generalized client server communication path which can be used with the present invention.
Figure 5:
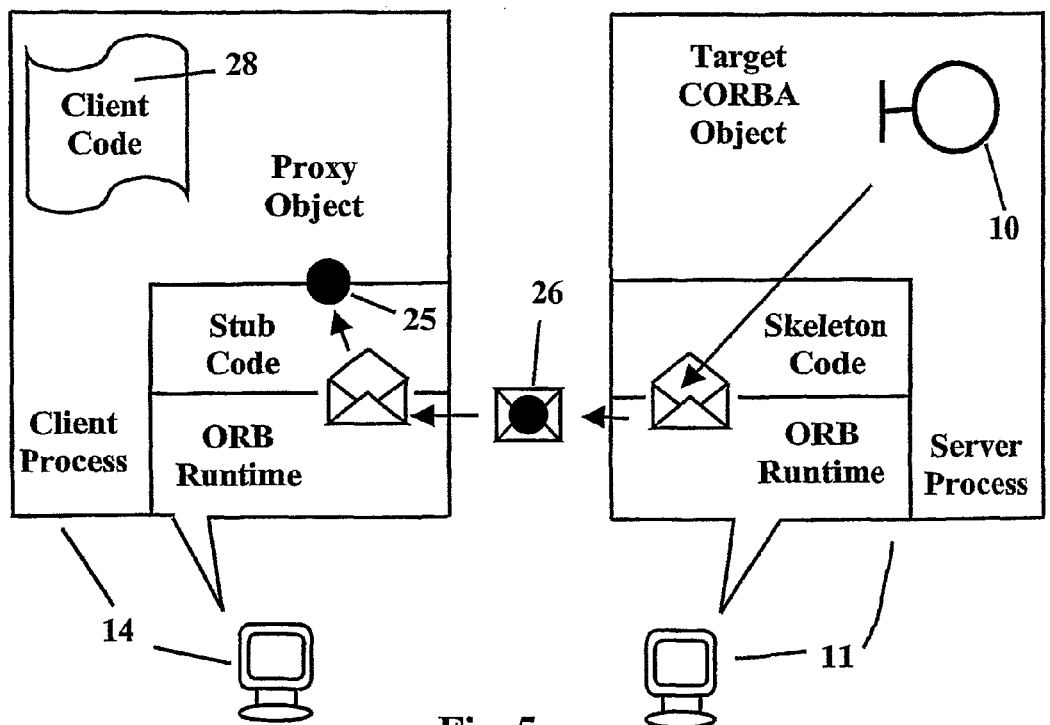
FIG. 5 is a representation of the transmission of a distributed object from a server application to a client in accordance with an embodiment of the present invention.
Figure 6:
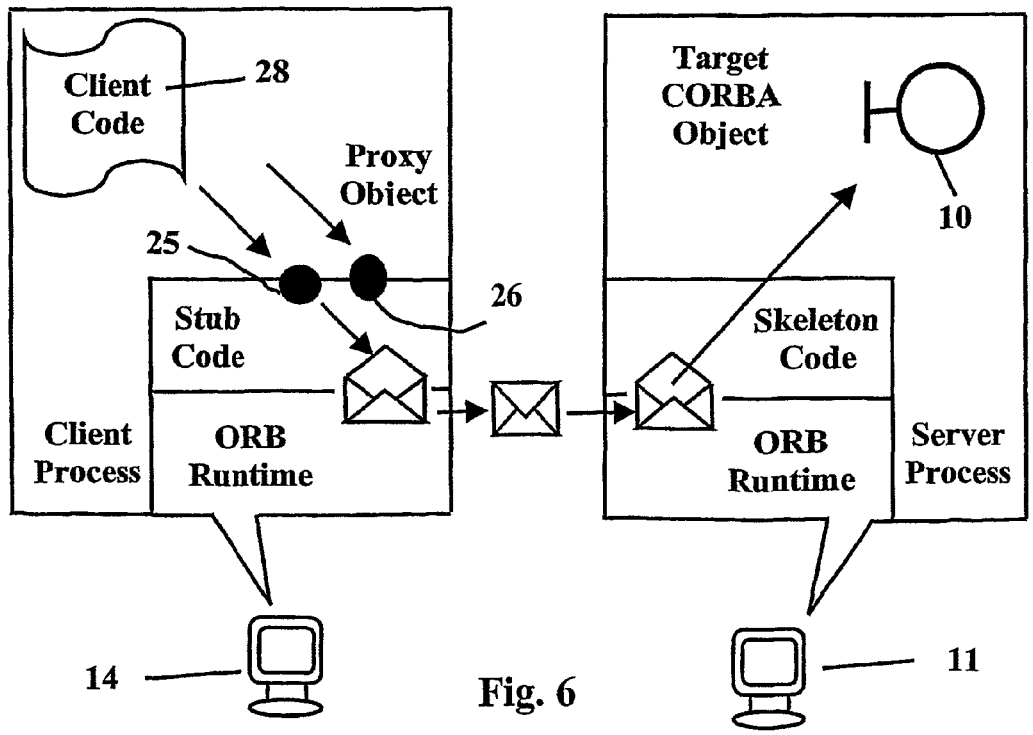
FIG. 6 is a representation of how a client accesses an application running on a remote server in accordance with an embodiment of the present invention.

An embodiment of the present invention will now be described with reference to FIGS. 4 to 6. A general architecture is shown in FIG. 4. A client terminal can access a remote server 11, e.g. via networks 16, 18. A CORBA compliant application such as MD 10 running on server 11 has a CORBA interface (the T connection) so that it can be accessed from the client terminal 14. The application MD10 may access other nodes of the network, e.g. a database server 19 where specific data may be stored, e.g. user profiles. Let us consider the case of a client of network 1 who asks to be connected to MD 10 and who has the right (as defined by the profile) to manage the communications on BN 4 (the one managed by the MD 10) for the organizations 6 and 8. Firstly, the client terminal 14 contacts the server 11 using conventional communication software. After verification of the rights of the client, the MD 10 will distribute two versions of the object CommMgr to this client, CommMgr 25 and CommMgr 26 (FIG. 5). The first version, CommMgr 25, will possess (by inheritance from the second object 27) the attributes corresponding to BN 4 and to the organization 6. This object 25 will allow the client to manage the communication of organization 6 (and only of this organization) on the BN 4 (also solely). The second distributed object CommMgr 26 will possess the attributes corresponding to BN 4 and to organization 8. When the client wishes to make a request to ME) 10, the client's terminal 14 will execute an application 28. The application 28 will access each of the proxies CommMgr 25 or CommMgr 26 in turn to carry out the request (FIG. 6). These proxies will enable a comparison of the request and their list of access privileges and coverage areas. Depending upon the results of this comparison, a proxy can enable forwarding of the request. For example, if the request does not match the coverage areas and privileges, the proxy fails to complete the request. If the two match then the proxy will enable forwarding of the request. As these are the only two distributed objects which include an operation for making a request to the MD 10, the client has no other possibility to make any other types of requests, i.e. cannot make an invalid request. In this way, by activation of the operations of either CommMgr 25 or CommMgr 26, the client will be able to manipulate the communications and allocations of organization 6 or those of organization 8, as defined with respect to BN 4. On the other hand, the client will never be able to activate an operation in the name of another organization for which he has no rights, or on another BN, as he does not possess any proxy from which to activate such operations.

If the rights and privileges of an organization change, the second object 27 is updated, i.e. the one defining these rights and privileges and MD10 is re-instantiated to inherit the new definitions. CommMgr 25 and/or 26 is then redistributed to the relevant client including the updated privileges and/or geographical areas. The present invention also includes use of the property that the distributed object CommMgr may inherit from a plurality of second objects.

The principle of limitation of range of a service by inheritance of properties can be extended in accordance with the present invention as desired. It allows to carry out a control at the source, i.e. at the client's premises external to OMN 16. By restricting the client to choose an object on which an operation is activated, the client is forced to make a choice between the domains authorized by the client's profile. Furthermore, the domains can have "crossed" ranges and be represented in the form of matrixes.

Figure 8:
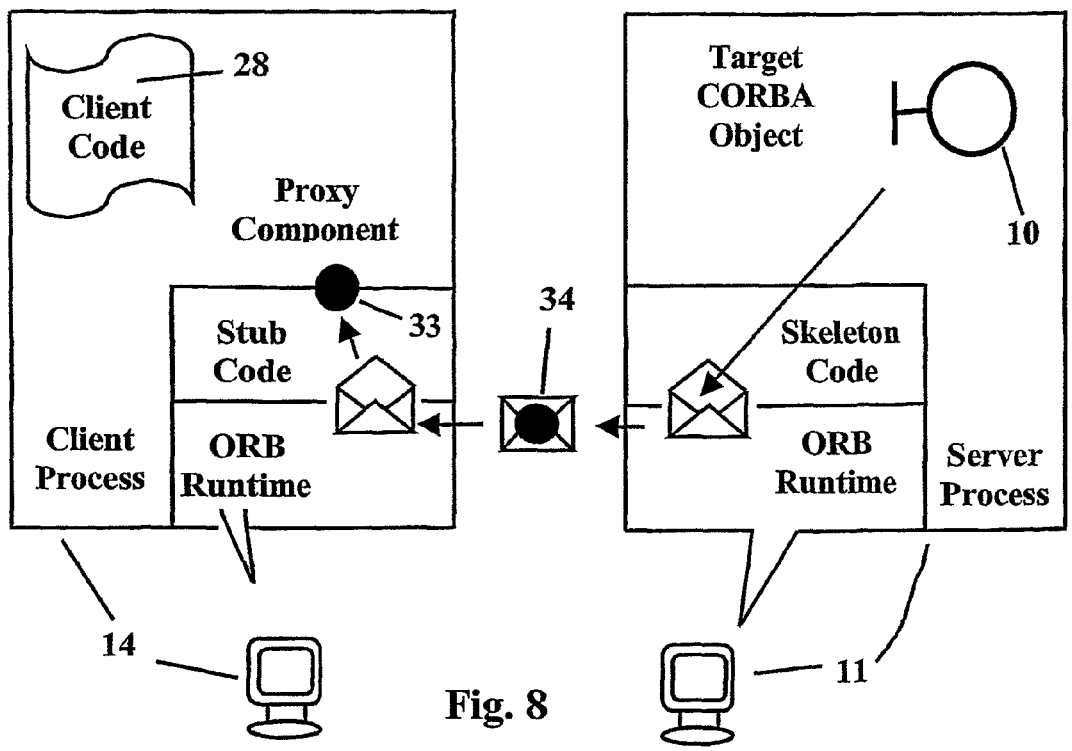
FIG. 8 is a representation of the transmission of a distributed object component from a server application to a client in accordance with another embodiment of the present invention.
Figure 9:
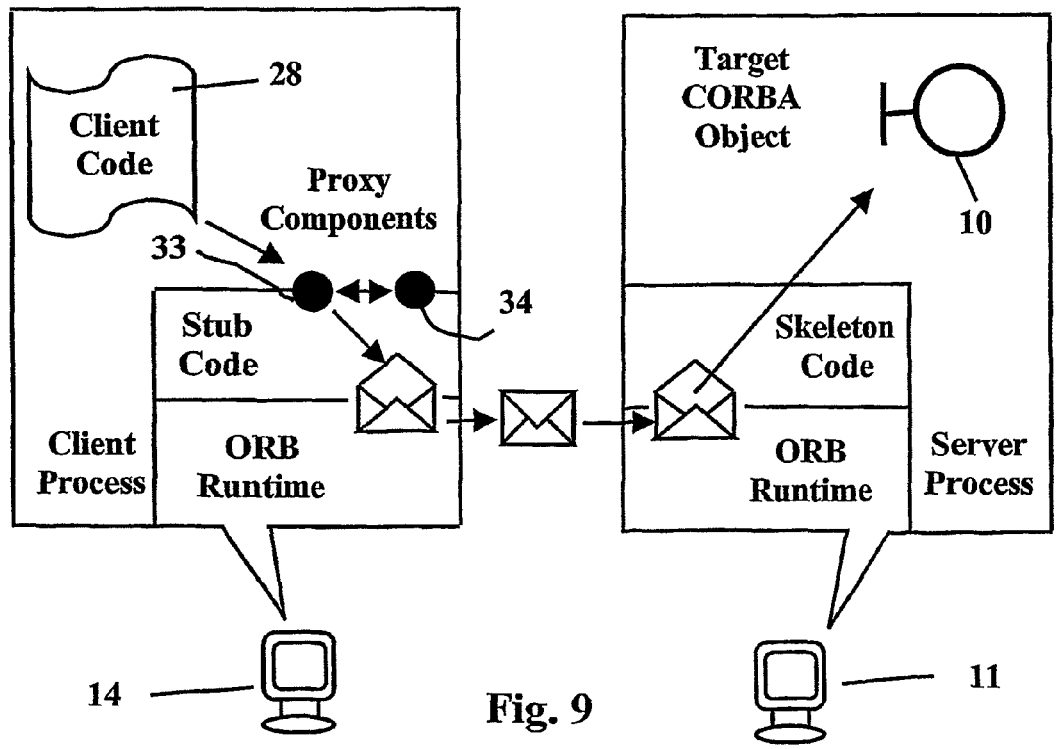
FIG. 9 is a representation of how a client accesses an application running on a remote server in accordance with another embodiment of the present invention.

A further embodiment of the present invention will be described with reference to FIGS. 8 and 9. This embodiment provides a proxy object CommMgr 25 comprising two proxy object components 33, 34. At least one of the components 33, 34 is distributed from the server 11 to the client 14, namely that component 34 which contains a definition of the rights and privileges of an organisation (FIG. 8). The other component which is mainly a communications object may be locally installed on the client terminal 14 or may also be distributed by the server 14.

When an organization wishes to make a request to the server 11, the client's terminal 14 will execute an application 28. The application 28 will access proxy component 33 of CommMgr 25 to carry out the request (FIG. 9). This proxy component 33 retrieves information relevant to the issue of security by examination of the contents of the request and transmits this data, either in clear or encrypted form to proxy component 34. Proxy component 34 is adapted to perform a comparison of the security information contained in the request and the list of access privileges and coverage areas it contains. It does this in accordance with rules which it contains. The request is forwarded dependent upon the comparison. For example, if the request does not match the coverage areas and privileges, the proxy component transmits a "communication fails" message to proxy component 33 which then fails to complete the request. If the two match then the proxy component 34 sends a "communication accepted" message to component 33 which on receipt enables forwarding of the request. Note that an organization has a global access right to the management object which is to be modified by the request. The comparison made by the proxy relates to whether the intended modification goes beyond that allowed for the specific organization.

The advantage of this embodiment is that if the rights and privileges of an organization change, only the one proxy component 34 needs to be re-distributed. This will generally be of much smaller size than the communications proxy component 33, which may include complete communications software. Hence, traffic on the network is reduced. The proxy component 34 may inherit the rights and privileges from the second object 27, i.e. the one defining these rights and privileges.

It will be understood by the skilled person that reference to a "distributed object", "method", "operation", "data object" in accordance with the CORBA standard refers in principle to abstract concepts used only for design purposes. A CORBA object is defined as an abstract entity having an identity, an interface and an implementation. In reality the objects of the invention will be implemented in an object oriented language such as Sun Microsystems' Java or similar. Hence, they refer to real objects in any concrete implementation. It should be understood that reference to "objects", "operations" and "methods" may be seen as abstract for the convenience of describing the present invention within the terms of a standard such as CORBA but that these objects, methods and operations are implemented in accordance with the present invention in a concrete programming language.

Figure 7:
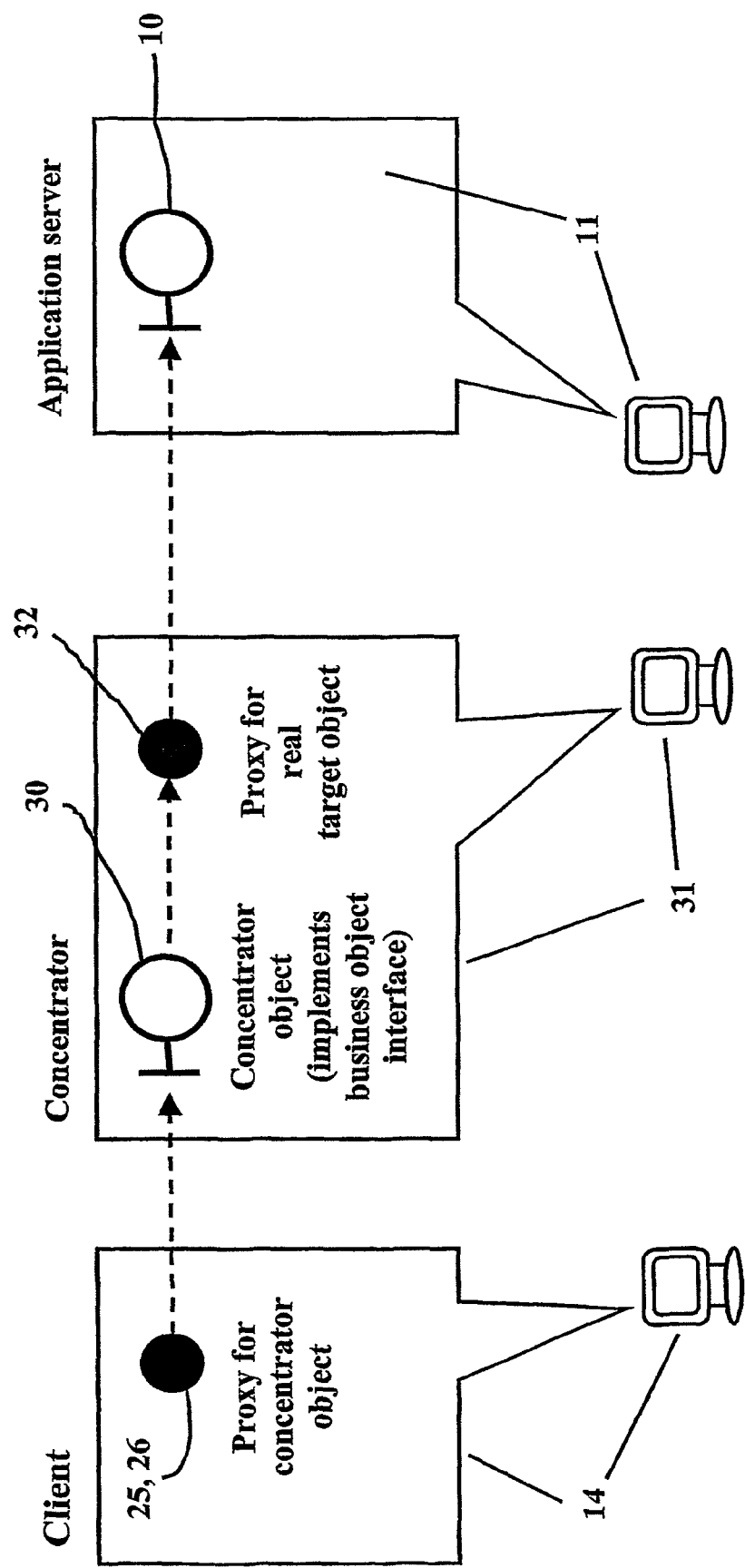
FIG. 7 is a schematic representation of an alternative message path in accordance with an embodiment of the present invention using a concentrator.

While the invention has been shown and described with reference to preferred embodiments, it will be understood by those skilled in the art that various changes or modifications in form and detail may be made without departing from the scope and spirit of this invention. For instance, although reference has been made to a client terminal 14 access a server 11 directly, the present invention includes more complex architectures especially those designed to be scaleable. For instance the present invention includes the use of an intermediate concentrator (FIG. 7). In this case the proxy CommMgr 25 or 26 accesses a concentrator object 30 located on a suitable node of the network 16 or 18, such as a server 31. The concentrator object 30 in turn uses a further proxy 32 to access MD 10 on server 11. As the authentication of the client has been carried out by proxy 25, 26 at the client's terminal or system, the applications running on server 31 such as the concentrator object 30 need not re-authenticate the client, nor require delegation of any privileges or access codes from proxy 25 or 26.

The invention claimed is:

1. A method of operating a telecommunications network for shared use by at least two user sets, the network comprising at least one server and a plurality of clients, each client being associated with one of the user sets, the method comprising:
   generating a privilege definition object for each user set, the privilege definition object defining at least one network use privilege of its associated user set;
   distributing, from the server to at least one client associated with a user set, at least one component of a proxy communications object, each distributed proxy communications object inheriting from the privilege definition object, a definition of the at least one network use privilege of the user set associated with the client;
   receiving, at the proxy communications object, a request by a member of the user set to use the network;
   comparing, by the proxy communications object, content of the request with the definition of at least one network use privilege of the user set associated with the client; and
   determining, by the proxy communications object, whether to enable or block forwarding of the request to the server based on results of the comparison.

2. A method as defined in claim 1, further comprising:
   modifying the definition of at least one privilege at a privilege definition object for a user set; and
   inheriting, from the modified privilege definition object, the modified definition of the at least one privilege at the proxy communications object of at least one client associated with the user set.

3. A method as defined in claim 2, wherein the inheriting step comprises inheriting, from the modified privilege definition object, the modified definition of the at least one privilege at the proxy communications object of each client associated with the user set.

4. A method as defined in claim 1, wherein the user sets are distinct organizations.

5. A method as defined in claim 1, wherein the user sets are distinct user groups within an organization.

6. A telecommunications network for shared use by at least two user sets,
   the network comprising at least one server and a plurality of clients,
   each client being associated with one user set,
   each user set having an associated privilege definition object defining at least one network use privilege of its associated user set,
   the server being operable to distribute at least one component of a proxy communications object to each client,
   each distributed proxy communications object inheriting a definition of at least one privilege of the user set associated with the client from the privilege definition object associated with the user set, each client being operable to process a request by its associated user set to use the network by:
comparing content of the request with the definition of at least one privilege of the user set associated with the client; and
enabling or blocking forwarding of the request to the server in response to results of the comparison.

7. A telecommunications network as defined in claim 6, wherein a modified definition of at least one privilege is inherited from the privilege definition object by the proxy communications object on at least one client in response to the definition being modified at the associated privilege definition object.

8. A telecommunications network as defined in claim 7, wherein a modified definition of at least one privilege is inherited from the privilege definition object by the proxy communications object on each client associated with a user set in response to the definition being modified at the privilege definition object associated with that user set.

9. A telecommunications network as defined in claim 6, wherein the user sets are distinct organizations.

10. A telecommunications network as defined in claim 6, wherein the user sets are distinct user groups within an organization.

11. A client for communication with a server on a telecommunications network for shared use by at least two user sets, the client comprising:
a network port operable to couple the client to the server;
a proxy communication object coupled to the network port and operable:
to receive a component of the proxy from the server, the component comprising a definition of at least one privilege of a user set associated with the client;
to receive a request by a user to use the network;
to compare content of the request with the definition of at least one privilege of the user set associated with the client; and
to determine whether to enable or block forwarding of the request to the server based on results of the comparison; and
to inherit modified definitions of the at least one privilege from an associated privilege definition object.

12. A client as defined in claim 11, wherein the proxy communication object is operable to inherit a modified definition of the at least one privilege from the associated privilege definition object in response to the definition of that privilege being modified at the privilege definition object.

13. A client as defined in claim 11, wherein the user sets are distinct organizations.

14. A client as defined in claim 11, wherein the user sets are distinct user groups within an organization.

15. A method of operating a client for communication with a server on a telecommunications network for shared use by at least two user sets, the client comprising a proxy communication object, the method comprising:
receiving a component of the proxy from the server, the component comprising a definition of at least one privilege of a user set associated with the client from a privilege definition object associated with the user set;
receiving a request by a member of the user set to use the network;
comparing content of the request with the definition of at least one privilege of the user set associated with the client;
determining whether to enable or block forwarding of the request to the server based on results of the comparison.

16. A method as defined in claim 15, further comprising inheriting a modified definition of at least one privilege from the privilege definition object in response to the definition being modified at the privilege definition object.

17. A method as defined in claim 15, wherein the user sets are distinct organizations.

18. A method as defined in claim 15, wherein the user sets are distinct user groups within an organization.

* * * * *